Patented Apr. 21, 1931

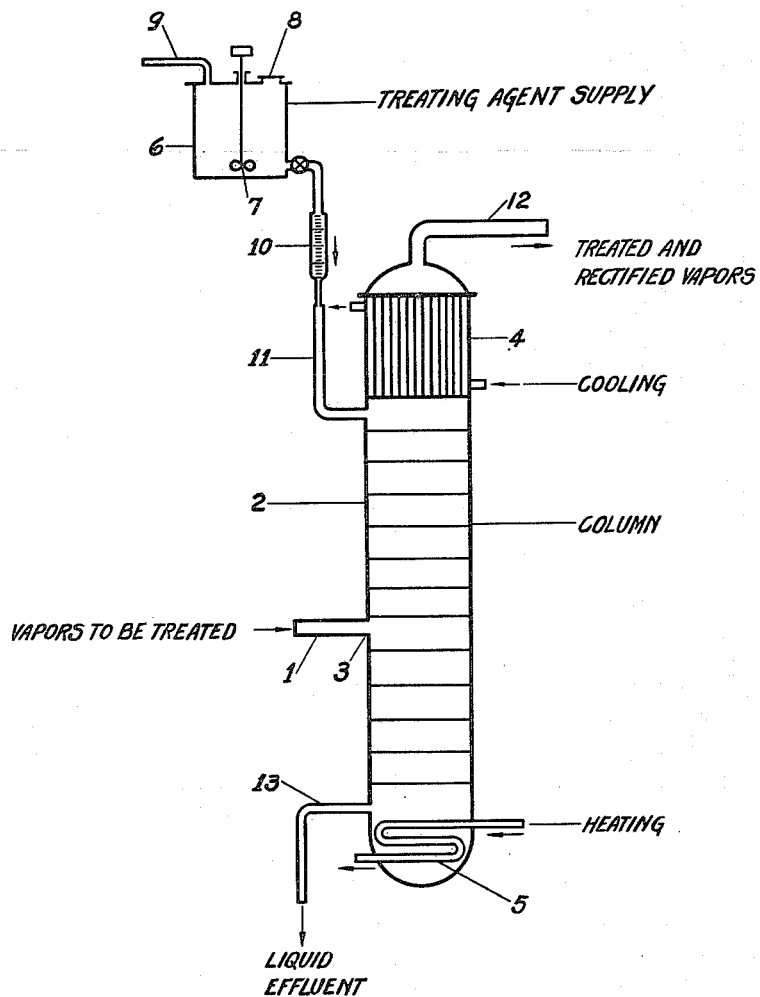

1,801,412

UNITED STATES PATENT OFFICE

PAUL JOHNSON CARLISLE, OF NIAGARA FALLS, NEW YORK, ASSIGNOR, BY MESNE ASSIGNMENTS, TO THE ROESSLER & HASSLACHER CHEMICAL COMPANY, OF NEW YORK, N. Y., A CORPORATION OF DELAWARE

PROCESS FOR TREATING AND RECTIFYING VAPORS

Application filed November 25, 1927. Serial No. 235,503.

This invention relates to the treatment of vapors and especially hydrocarbon vapors. These hydrocarbons may be obtained from any source, such as the distillation of crude petroleum, cracking of hydrocarbons, hydrogenation of coal, distillation or extraction of oil shale, casing head gasoline, etc. This invention is applicable to individual hydrocarbons as well as to mixtures.

These untreated products are usually undesirable for use because of the presence of substances such as certain sulphur compounds and unstable hydrocarbons which have an unpleasant odor, which resinify on standing, etc. Thus in gasoline for motor use those undesirables must be reduced to render the product stable and saleable. In the succeeding specification my invention will be particularly described with reference to what is commonly known as gasoline, but I do not wish to be limited thereto since my invention is applicable to the treatment of hydrocarbons in general. Indeed, the process is not limited to hydrocarbons since it may be used wherever the simultaneous rectification and treatment of vapors is desired.

The treating of crude gasoline usually results in the formation of certain solid and liquid by-products which may be polymers of unsaturated compounds in the gasoline or may be compounds of the treating agent with certain constituents of the gasoline, or both. In general, such by-products are troublesome since they tend to foul the treating apparatus and the treating agent. In many cases it is necessary for economic reasons to recover the treating agent from its mixture with the by-products; this, of course, adds an extra operation, and may be attended with considerable difficulty and expense. This prohibits the use of relatively expensive treating agents even though they produce a superior product. Thus, for example, such difficulties form one of the principal reasons why alkali metals have not been used to any great extent commercially in treating crude gasolines even though it is known that the treated product is of excellent quality.

Gasolines of high quality can be produced by contacting crude gasoline vapors with a treating medium consisting of alkali metal in liquid hydrocarbon, removing a part of the treated gasoline as vapors and part as liquid, the latter serving to remove the treatment by-products, in solution, in suspenson or both. The liquid portion can then be treated by such processes as distillation for recovery of its gasoline content.

The object of this invention is to provide a process for treating vapors comprising subjecting vapors undergoing rectification to the action of a treating agent in the reflux liquid, said agent and liquid flowing in counter current to the vapors undergoing rectification and removing the treated rectified vapors by way of the reflux means and removing the treatment by-products with the higher-boiling liquid effluent. A specific object is to provide a process for treating gasoline vapors from cracking processes and from straight run distillations of crude oils.

The accompanying drawing illustrates diagramatically one form of apparatus suitable for applying the principles of this invention.

Lower boiling hydrocarbons consisting of those fractions commonly designated as gasoline and kerosene together with any "wild", i. e., still more volatile gases are passed as vapors by way of pipe 1 into a distilling column 2 at a suitable point 3. The column is provided with a reflux condenser, 4, and with a heating coil, 5.

Vessel 6 contains treating agent and is equipped with an agitator 7 and with heating means not shown. Opening 8 is used for introducing alkali metal and pipe 9 for introducing liquid hydrocarbon. A flowmeter 10 for treating agent which is introduced by way of pipe 11 into one of the upper sections of the column, is provided.

The treated and distilled gasoline leaves the column by way of pipe 12, as vapor and upon condensation is ready for use.

The higer boiling liquid hydrocarbons together with the treatment by-products flow downward through the column and leave the column by pipe 13. This effluent can be passed to a separating means such as a filter or a centrifuge and the clarified liquid disposed of in any desired way; for example, it can be cracked.

There are many ways in which alkali metal may be introduced into the column. Thus, it may be introduced as a stream of molten metal, as a colloidal suspension, as finely divided solid metal, or in any other suitable form. One method of making and applying colloidal sodium consists in passing a condensed electric spark between two sodium electrodes placed at a suitable distance from each other under a liquid such as ether, xylene, etc. Such a colloidal suspension is then introduced directly into the column.

I prefer to distribute the alkali metal in liquid hydrocarbon outside of the column and to introduce this mixture into the column. This mixture may be prepared in vessel 6 by introducing alkali metal and liquid hydrocarbon and suitably agitating the mixture at a temperature preferably above the melting point of the alkali metal. A measured rate of the mixture is introduced into one of the sections at a sufficient distance above the inlet for the hyrocarbon vapors to be treated and rectified so as to insure sufficient treatment and a satisfactory degree of utilization of the alkali metal.

In most cases it is desirable to confine as largely as possible the treating action to the hydrocarbons which leave the column as vapors. To do this the alkali metal should be fed at such a rate that substantially all of it is utilized in the upper part of the column. Therefore the alkali metal should not be fed at an excessive rate. To this end it is also an advantage to have the alkali metal as finely subdivided as possible.

In order to avoid ambiguity and a multiplicity of claims, the following definitions of the terms used in the claims and specification are here given: The term "alkali metal" covers these metals, i. e., sodium, potassium, etc., singly or in various combinations or mixtures with each other or with other metals such as calcium, magnesium, mercury, lead, tin, etc., in any applicable physical state. The term "by-products" covers all of the substances that are formed in the treating medium and that are not removed with the treated hydrocarbon vapors leaving the rectifier. The term "hydrocarbons" stands for mineral oils, gasolines, and any other hydrocarbon materials that may be improved by such treatment as herein described. The term "reflux liquid" covers the liquid component in a rectifier, traveling counter current to the flow of vapor. The term "rectifier" obviously includes any device suited for rectification such as a plate column, a sieve column, a packed tower, etc.

Claims:
1. The process of treating vapors comprising subjecting hydrocarbon vapors undergoing rectification to the action of alkali metal in the reflux liquid, said alkali metal and liquid flowing in counter current to the vapors undergoing rectification at such rate that said alkali metal is substantially completely reacted between the point of its introduction and the vapor inlet; removing a portion of the treated hydrocarbon as vapor; and refluxing sufficient of said treated hydrocarbon to suspend said alkali metal, and by its flow to substantially completely remove contaminating by-products from the surface of the alkali metal and from the rectifying means.

2. The process of treating vapors comprising subjecting hydrocarbon vapors undergoing rectification to the action of sodium in the reflux liquid, said sodium and liquid flowing in counter current to the vapors undergoing rectification at such rate that said sodium is substantially completely reacted between the point of its introduction and the vapor inlet; removing a portion of the treated hydrocarbon as vapor; and refluxing sufficient of said treated hydrocarbon to suspend said sodium, and by its flow to substantially completely remove contaminating by-products from the surface of the sodium and from the rectifying means.

3. The treating process comprising passing freshly vaporized hydrocarbons from a cracking process into a rectifier in counter current to a treating medium consisting of alkali metal in refluxed liquid hydrocarbon at such rate that said alkali metal is substantially completely reacted between the point of its introduction and the vapor inlet; removing a portion of the treated hydrocarbon as vapor; and refluxing sufficient of said treated hydrocarbon to suspend said alkali metal, and by its flow to substantially completely remove contaminating by-products from the surface of the alkali metal and from the rectifying means and removing treated hydrocarbon vapors of the desired boiling range.

4. The process of treating hydrocarbon vapors comprising subjecting hydrocarbon vapors undergoing rectification to the action of finely divided sodium in the reflux liquid, said sodium and liquid flowing counter current to the vapors undergoing rectification and removing the treated, rectified vapors by way of the reflux means and removing the treatment by-products with the higher-boiling liquid effluent.

5. The process of treating hydrocarbon vapors comprising subjecting hydrocarbon vapors undergoing rectification to the action of colloidal sodium in the reflux liquid, said sodium and liquid flowing counter current to the vapors undergoing rectification and removing the treated, rectified vapors by way of the reflux means and removing the treatment by-products with the higher-boiling liquid effluent.

6. Process comprising subjecting hydrocarbon vapors to rectification and continuously adding finely divided alkali metal to the reflux liquid formed by partial condensation of said vapors such that the vapors undergoing treatment will flow counter-current to a treating medium consisting of said alkali metal suspended in said reflux liquid at such rate that said alkali metal is substantially completely reacted between the point of its introduction and the vapor inlet to the rectifying means, removing treated and rectified vapors by way of the reflux means and removing the treatment by-products with the liquid effluent from the rectifying means.

Signed at Niagara Falls, in the county of Niagara and State of New York, this 19 day of November, A. D. 1927.

PAUL JOHNSON CARLISLE.

CERTIFICATE OF CORRECTION.

Patent No. 1,801,412.  Granted April 21, 1931, to

PAUL JOHNSON CARLISLE.

It is hereby certified that error appears in the printed specification of the above numbered patent requiring correction as follows: Page 2, lines 122 to 125, claim 4, and page 3, lines 2 to 5, claim 5, strike out the words "and removing the treated, reectified vapors by way of the reflux means and removing the treatment by-products with the higher boiling liquid effluent" and insert instead at such rate that said sodium is substantially completely reacted between the point of its introduction and the vapor inlet; removing a portion of the treated hydrocarbon as vapor; and refluxing sufficient of said treated hydrocarbon to suspend said sodium, and by its flow to substantially completely remove contaminating by-products from the surface of the sodium and from the rectifying means; and that the said Letters Patent should be read with these correction therein that the same may conform to the record of the case in the Patent Office.

Signed and sealed this 4th day of August, A. D. 1931.

Wm. A. Kinnan,
Acting Commissioner of Patents.

(Seal)